Figure 1:
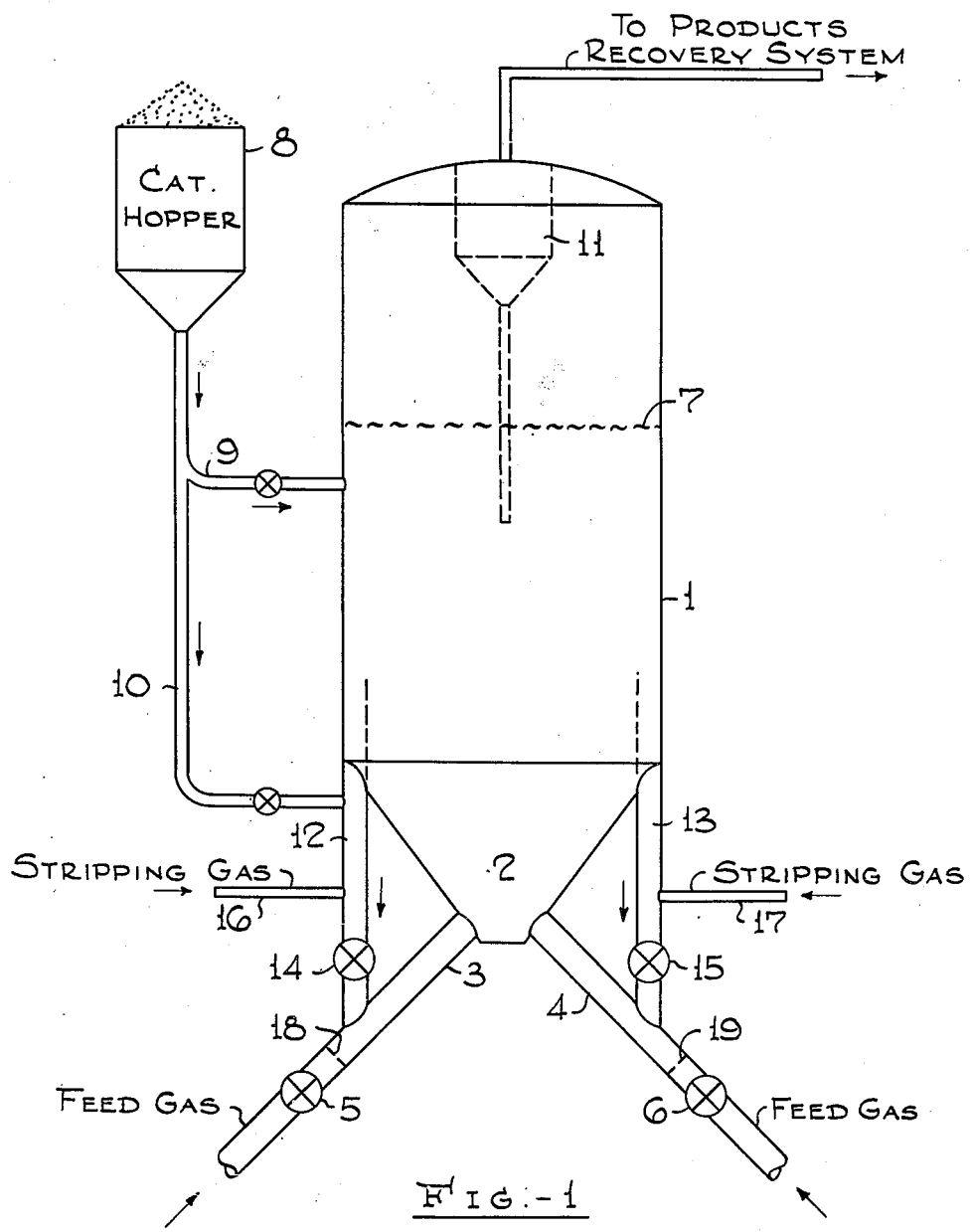

Walter F. Rollman  Inventor
By J. Coehman  Attorney

Nov. 13, 1951 W. F. ROLLMAN 2,575,297
PROCESS AND APPARATUS FOR CONTACTING FLUID SOLIDS WITH GASES
Filed April 30, 1949 2 SHEETS—SHEET 2

Walter F. Rollman Inventor
By J. Cushman Attorney

Patented Nov. 13, 1951

2,575,297

UNITED STATES PATENT OFFICE 2,575,297

PROCESS AND APPARATUS FOR CONTACT-
ING FLUID SOLIDS WITH GASES

Walter F. Rollman, Cranford, N. J., assignor to
Standard Oil Development Company, a corporation of Delaware Application April 30, 1949, Serial No. 90,588

9 Claims. (Cl. 260—449.6)

The present invention is a continuation-in-part of co-pending application Serial No. 23,590, filed April 27, 1948, now U. S. Patent No. 2,491,135 and relates to the contacting of subdivided solid particles with gases. More particularly, the present invention relates to an improved process and an apparatus for contacting solids and gases upflowing at velocities which normally result in substantial attrition and disintegration of such finely divided solids in the conventional type fluid solids reactor.

Processes wherein fluidized solids are contacted with gases have several important advantages over other types of gas-solid contacting processes. The fluidized solids operations are characterized by (1) a high degree of intimacy of contact between the gas and the solid particles (2) a substantial uniformity of temperature throughout the catalyst bed as a result of the rapid circulating of the solids and the accompanying extremely rapid rate of heat transfer from one section of the bed to another and (3) the ease of control of the temperature level of the fluidized bed.

The fluid technique of contacting subdivided solids with gases has found extensive application in many types of chemical processes, both catalytic and non-catalytic, exothermic and endothermic. Among the catalytic processes may be mentioned catalytic cracking of petroleum oils, the synthesis of hydrocarbons from carbon monoxide and hydrogen by the Fischer process, and the like. Among non-catalytic processes are various reduction reactions, as of ores, carbonization of finely divided carbonaceous material, and the preparation of synthesis gas for the hydrocarbon synthesis reaction.

The fluid technique has proven to be of particular interest in the catalytic synthesis of hydrocarbons from carbon monoxide and hydrogen, using finely divided catalysts of the iron group. Because of the very high heat release of the reaction, in the neighborhood of 35–50 KCal/mol of reactant, the improved heat distribution, transfer, and control obtained by the fluid process has made the latter the generally preferred method for carrying out this synthesis. However, advantageous as the fluidized technique has shown itself to be in its application to the hydrocarbon synthesis and other fields, the art as hitherto disclosed has several limitations which have limited the scope of its usefulness, applicability, and efficiency in many fields in which it is now employed.

Two of these limitations, which particularly affect the application of the fluid technique to the hydrocarbon synthesis process, but are also present in other processes, are the attrition and disintegration of the catalyst, and the agglomeration resulting from the fusion of both disintegrated and non-disintegrated particles into aggregates of non-fluidizable size. These aggregates eventually accumulate to such an extent that they seriously interfere with the fluid operation.

Catalyst disintegration is generally considered to be the result of two causes, namely (1) mechanical and (2) chemical. Chemical disintegration of an iron type hydrocarbon synthesis catalyst is thought to arise from deposition of carbon within the lattice structure of the catalyst crystal, and this may be controlled by selecting synthesis conditions which minimize carbon formation in the synthesis. Mechanical disintegration, or attrition, however, results from the impact of the fluidized particles with the equipment and with themselves, and is a function of their turbulence and their velocity.

As disclosed in the art, the fluid solids operation is usually carried out in a reactor in the form of a vertical cylinder, having a screen or grid located in a lower section. The purpose of such screen or grid is to support the dense catalyst bed and to provide suitable distribution for the fluidizing gasiform medium which is admitted from below and passes through the screen or grids. The number of grid openings and their size are such that substantially none of the subdivided solids descend downwardly through the grid.

However, it is a demonstrated fact that attrition using this method of introduction of gas is considerable, largely because of the jet action of the incoming gas. In order to obtain the desired superficial linear velocity of 0.3 to 5 feet per second for the gases through the reactor bed, a high gas inlet velocity is required, and the jet effect of this gas passing through the distributor orifices causes a substantial amount of attrition of the catalyst.

Another and allied problem inherent in the use of a perforated plate, screen, or grid as a support for a fluid bed is the problem of insuring complete fluidization throughout the bed. The channeling action of the gases at the extreme bottom of the reactor results in the formation of a fixed bed resting on the perforated plate. The presence of this fixed, or relatively stationary, bed of catalyst in the immediate vicinity of the grid leads necessarily to poor heat transfer and thus overheating and sintering of catalyst to form agglomerates which result in poor fluidization and also plug the grid.

The tendency to a fixed bed resting on the perforated plate can be overcome to a certain extent by increasing the number of holes through which the gas is introduced. Beyond a certain point, however, nothing can be gained by this method because some of the incoming gas, following the path of least resistance, will "short-circuit" across the top of the grid from one hole to the next. Consequently a tendency to a fixed bed formation immediately above the perforated plate can only be partially corrected at moderate gas velocities by increasing the number of holes. Likewise catalyst attrition is not reduced by increasing the number of orifices in the distributor plate.

Another way to reduce attrition would be to decrease the velocity of the gas through the orifices. However, it is necessary to use gas velocities high enough to maintain the fluidized catalyst bed in the reactor, and under such conditions the catalyst attrition due to mechanical action is serious.

Furthermore, the fragmented particles, or fines, tend to agglomerate in the system considerably more readily than the particles of fluidizable size, and thus agglomeration resulting from the use of a distributor grid support for the fluidized bed comes about both from the formation of a fixed or stationary bed of fluidizable particles immediately above said grid, and from the aggregation of fine particles resulting from the attrition of fluidizable particles by the jet action of the gasiform fluidizing medium through the grid.

The present invention overcomes these difficulties and affords additional advantages, the nature of which will be more fully understood from the following description.

It is the principal object of the present invention to provide an improved method and apparatus for carrying out the contacting of solids and gases in a fluidized bed which will not be subject to the limitations mentioned, and will thus permit a wider application of this technique. Another important object of the invention is to carry out high velocity fluid solids operations without excessive attrition of the subdivided solid. Still another object of the invention is to minimize substantially the formation of aggregates of non-fluidizable size within the fluid solids reactor. Other objects and advantages of the invention will become apparent from the description hereinafter.

It has now been found that thorough fluidization of the subdivided solids at the extreme bottom of the reactor can be insured and catalyst attrition minimized by a modification of the manner in which the reaction gases are introduced into the reactor. In accordance with the present invention, the subdivided catalyst in a fluid solids hydrocarbon synthesis reactor is withdrawn continuously through a series of vertical tubes near the periphery near the bottom of the reactor, which tubes connect with a corresponding number of inclined tubes manifolded together at the center of the bottom of the reactor and through which the reactant synthesis gases enter the reactor. The catalyst thus withdrawn from the reaction zone is picked up by the incoming gases and returned to said zone. The incoming mixture of catalyst and reactant gases passes into the reactor through a truncated cone so that the turbulent fluid bed condition is arrived at at a lower vapor inlet velocity than when catalyst is not recycled, without any tendency to a fixed bed formation at the extreme bottom of the vessel, thus avoiding any tendency to overheating or sintering of the catalyst as is the case when a distributor grid is present. Catalyst attrition is considerably less with this mode of operation wherein the catalyst is carried in suspension at a comparatively high velocity concurrently in a stream of reactant gases, the catalyst then disengaged and returned through vertical tubes to inclined tubes through which the reactant gases flow, thence back to the reactor, than when the synthesis gases are jetted directly into the mass of fluidized catalyst in the conventional manner by passage through a distributor grid. Thus it has been found that with regulated pickup of catalyst in a stream as in the present invention, wherein the catalyst particles are withdrawn from the bed through vertical tubes and discharged for recycle into inclined tubes, turbulence required to insure motion of all of the catalyst in the reactor is minimized, further decreasing attrition.

The invention will best be understood by referring to the accompanying diagrammatic representations of modifications of the present invention. In the description, the operation of the invention will be exemplified by its application to the hydrocarbon synthesis process, though it is to be understood that the invention is applicable to any process involving the contacting of subdivided solids with gases in order to effect physical or chemical changes.

Referring now in detail to Figure 1, 1 is a reactor preferably in the form of a vertical cylinder with a conical base 2 having its apex removed. At or near the base of said cone a series of inclined tubes 3, 4, etc. converge and discharge directly into reactor 1. A synthesis gas feed mixture of $H_2$ and $CO$ in the ratio of about 1-2 mols $H_2$ to 1 mol $CO$ is introduced into reactor 1 through lines 3 and 4. Lines 3 and 4 are equipped with valves 5 and 6.

Within reaction vessel 1 a mass of subdivided alkali metal promoted iron catalyst having a particle size distribution such that less than 20% of the particles have diameters 0–20 microns and less than 10% of the particles have diameters larger than 80 microns is maintained in the form of a dense turbulent bed, having a well defined upper level 7. This catalyst may be supplied to reactor 1 from catalyst hopper 8 through line 9, though initially it may be supplied through line 10 as disclosed below. The superficial velocity of the gases within reactor 1 is preferably maintained in the range of 0.3 to 5.0 feet per second. Under these conditions the catalyst in reactor 1 assumes the form of a turbulent mass, resembling a boiling liquid with a more or less well defined upper level 7 and having an apparent density of about 25 to 75 lbs. per cu. ft., dependent upon fluidization conditions, the lower apparent density being associated with the higher velocities. The pressure within the reactor is maintained at from about 200 to about 650 p. s. i. g. depending upon the type conversion product desired, and the temperature within the fluidized mass is kept uniform in the range of 400°–750° F.

by appropriate methods of temperature control, such as internal or external coils (not shown). Volatile reaction products, entrained catalyst, and unreacted synthesis gases are withdrawn through gas-solids separators, such as cyclone 11, the bulk of the entrained catalyst being returned to the dense bed, and the volatile products and unreacted gases are withdrawn overhead and treated in any manner desired.

Catalyst is continuously withdrawn from the base of the inverted conical bottom 2 of reactor 1 through a series of vertical pipes, of which 12 and 13 in the drawing are illustrative, which are located at the periphery of the reactor 1. The rate of catalyst flow through these several draw-off tubes may be controlled by valves 14 and 15. The catalyst thus withdrawn is discharged into a series of corresponding inclined tubes 3, 4 etc., through which synthesis gas is introduced into reactor 1. The catalyst is picked up by the incoming synthesis gas mixture and both are carried concurrently into reactor 1.

Above valves 14 and 15, stripping gas may be introduced through lines 16 and 17. Such stripping gas may comprise steam or tail gas from the system, and its purpose is to remove adsorbed and adhering reaction products from the catalyst. Also, below the point at which the synthesis gases mix with the catalyst, it is preferable to include screens 18 and 19 in gas inlet lines 3 and 4 to prevent plugging of the feed gas inlet line when the gas flow is shut off.

When reactor 1 is started up it may be preferable to feed catalyst into vertical draw-off line 12 through line 10 instead of into reactor 1 proper through line 9.

Figures 2–5 show in somewhat more detail, preferred modifications of the invention specifically relating to the means for introduction of the gaseous suspension into the reactor. Thus Figure 2 comprises a front and Figure 3 a bottom view of the inlet arrangement at the bottom of the reactor shown in Figure 1. For illustrative purposes, the cone is shown as having an angle of about 60° with the horizontal, and the inlet tubes an angle of about 45° with the horizontal. If desired, these dimensions may be varied, but both cone and inlet tubes must have a considerable upward slope.

In Figure 1 two inlet tubes are shown, and in Figures 2, 3, 4 and 5, four inlet tubes are shown. It is preferable to have a plurality of inlet tubes, the total number depending upon mechanical and fabrication cost considerations. Thus it is desirable to have at least three inlet tubes, and as many as fifteen may advantageously be employed.

Figures 2, 4:
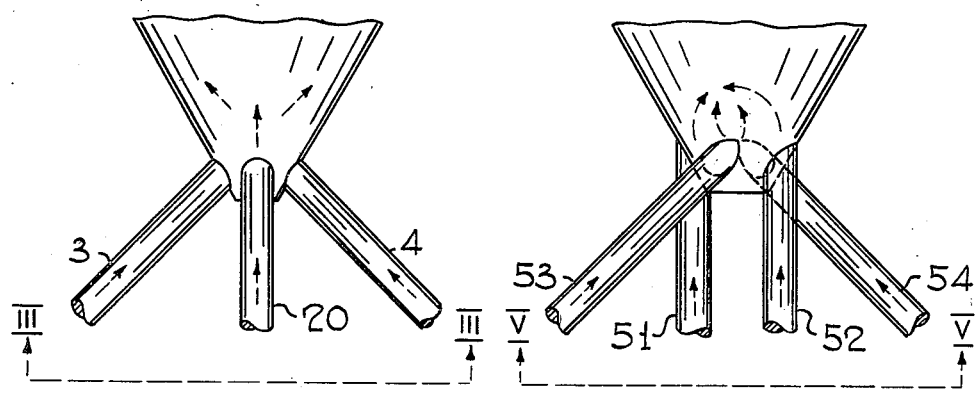
Figures 3, 5:
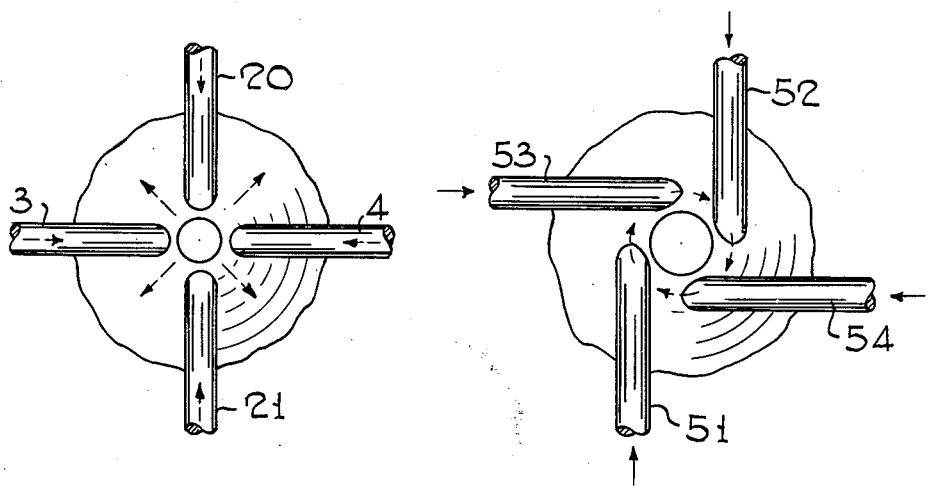

Figures 4 and 5 show an alternative arrangement of inlet tubes designed to permit smooth and uniform catalyst fluidization by causing the suspension of solids in gases to assume a cyclonic flow pattern. This is accomplished by bringing in the inlet lines 53, 54, etc. tangential to the periphery of the cone. By the tangential introduction of the suspension, the latter is caused to flow in a cyclonic or spiral path, whereby mechanical attrition is further minimized.

The embodiment of the invention as illustrated in the diagrammatic representation and in the foregoing description admits of modifications readily apparent to those skilled in the art, and which are within the scope of the invention. Thus the vertical draw-off tubes may be extended to the level of the top of the fluidized bed. The draw-off tubes may be part of a heat exchanger equipment to provide for cooling or heating of the subdivided solids as required.

The foregoing description, though illustrating specific applications of the invention, is not intended to exclude other modifications obvious to those skilled in the art, and which are within the scope of the invention.

What is claimed is:

1. An apparatus of the character described comprising in combination a vertically elongated reaction chamber having a bottom section in the form of a truncated inverted cone, a plurality of substantially vertical draw-off tubes extending downwardly from said chamber and located about the periphery of said chamber adjacent to the base of said inverted cone and adapted to conduct fluidizable solids from said reaction chamber, a corresponding number of inclined tubes in open communication with said first-mentioned tubes and extending to and in open communication with the lower portion of said cone and adapted to the passing of a suspension of finely divided solids in fluidizing gas to said reaction chamber, each of said vertical tubes feeding into a corresponding inclined tube at a point of junction, and conduit means for feeding a fluidizing gas into and upwardly through said inclined tubes, said conduit means being located below said point of junction, said apparatus being further characterized in that said inclined tubes enter said inverted conical section substantially tangentially with respect to the curved surface of said inverted conical section at points spaced above the bottom-most portion of said truncated cone.

2. The apparatus of claim 1 wherein said vertical draw-off tubes are supplied with conduit means for introducing stripping gas.

3. The apparatus of claim 1 wherein said reaction chamber is provided with a conduit means for introducing finely divided solids.

4. The apparatus of claim 1 wherein at least one of said vertical draw-off tubes is provided with a conduit means for introducing finely divided solids.

5. The apparatus of claim 1 comprising at least three vertical draw-off tubes and three corresponding inclined tubes.

6. The apparatus of claim 1 wherein said truncated cone has a substantial upward slope.

7. The apparatus of claim 6 wherein said cone has an angle of about 60° with the horizontal.

8. In the process of contacting finely-divided solids in a reaction zone, the cross-sectional area of the bottom of which increases in an upward direction, and which process comprises the continuous withdrawal downwardly from said reaction zone of at least a portion of said finely-divided solids in the form of a plurality of substantially vertical moving aerated streams and the suspending of said solids in a fluidizing gas, and further passing separate streams of said gaseous suspension upwardly along inclined paths corresponding in number to said vertical streams and uniting said paths in the lower portion of said reaction zone, the improvement which comprises passing said streams tangentially into the lower portion of said reaction zone whereby said gaseous suspension is given a cyclonic flow pattern within said zone.

9. In the process of converting carbon monoxide and hydrogen to normally liquid hydrocarbons and oxygenated products, which process comprises contacting carbon monoxide and hydrogen in synthesis proportions at synthesis conditions with a dense turbulent fluidized mass of finely divided synthesis catalyst in a fluidized solids reaction zone, which zone comprises a bottom portion, the cross-sectional area of which increases in an upward direction and which process further comprises withdrawing continuously at least a portion of said catalyst in the form of substantially vertical downwardly flowing streams, said streams being withdrawn from the periphery of the lower portion of said zone and passing separate streams of said solids suspended in synthesis gas upwardly along inclined paths corresponding in number to said vertical streams and uniting said streams from the bottom portion of said reaction zone, the improvement which comprises passing said last-named streams tangentially into the lower portion of said reaction zone whereby said gaseous suspension is given a cyclonic flow pattern within said zone.

WALTER F. ROLLMAN.

REFERENCES CITED

The following references are of record in the file of this patent:

UNITED STATES PATENTS

| Number | Name | Date |
|--------|------|------|
| 2,491,135 | Rollman | Dec. 13, 1949 |